UNITED STATES PATENT OFFICE.

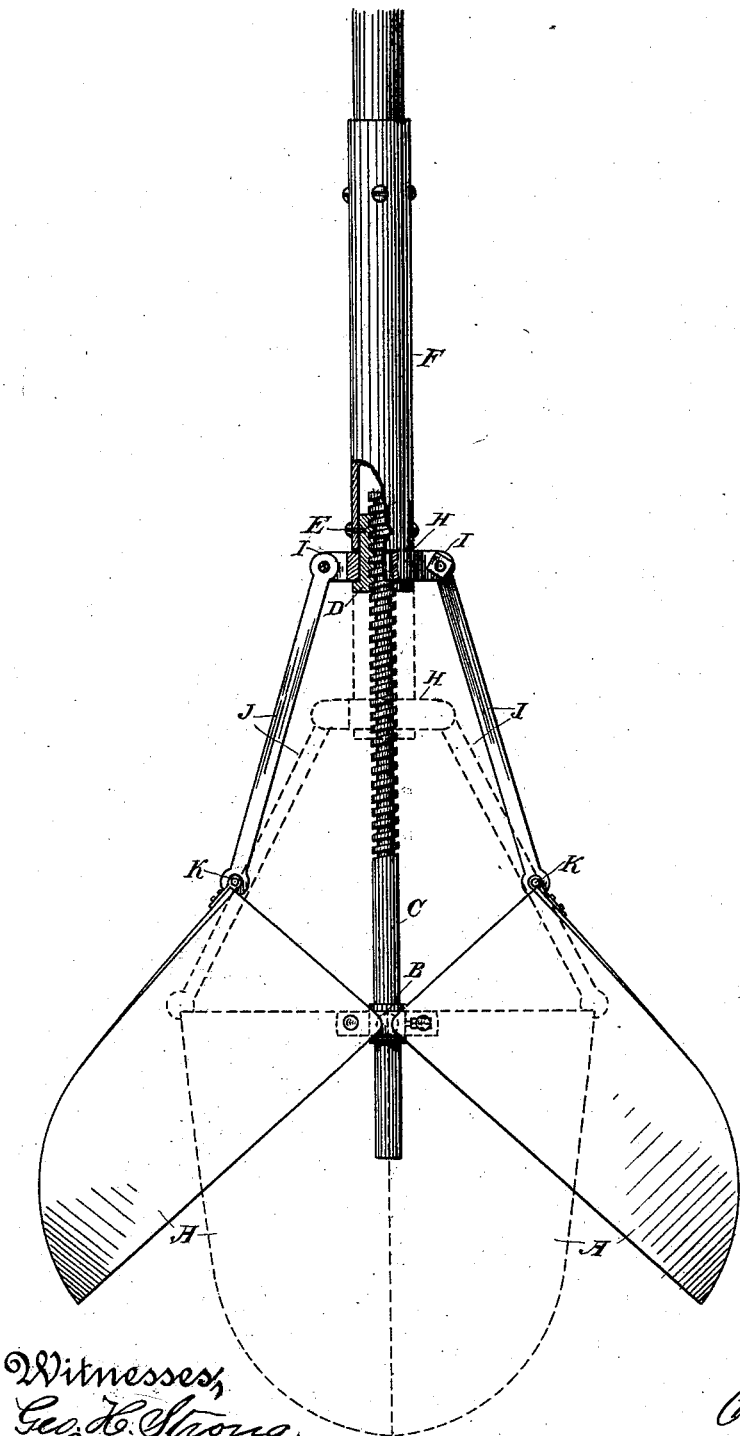

JOHN HATCH, OF SAN FRANCISCO, CALIFORNIA.

PROSPECTING-DREDGE.

SPECIFICATION forming part of Letters Patent No. 392,120, dated October 30, 1888.

Application filed June 9, 1888. Serial No. 276,609. (No model.)

*To all whom it may concern:*

Be it known that I, JOHN HATCH, of the city and county of San Francisco, State of California, have invented an Improvement in Prospecting-Dredges; and I hereby declare the following to be a full, clear, and exact description of the same.

My invention relates to a device which I call a "prospecting-dredge;" and it consists of two oppositely-hinged buckets which are adapted to open and close, so as to separate or close the lower edges, and in combination with these of a vertical screw-shaft secured to the center about which the buckets are hinged, a nut which is caused to travel up and down the screw-shaft to open and close the buckets by the rotation of the shank to which it is connected, and connecting-rods extending from a sleeve or collar loosely encircling said nut to the upper outer edges of the buckets.

Referring to the accompanying drawings for a more complete explanation of my invention, the figure is a view showing the device open. The dotted lines show it closed.

A A are two hollow scoop-shaped buckets having the upper inner angles hinged to lugs which project from the horizontal shaft B, as shown. The lower edges of these buckets are made semicircular or scoop-shaped and oppose each other, so that when closed by force they will gather up any material which may lie between them, and when opened the lower edges are separated sufficiently to allow the material to be deposited wherever desired.

C is a shank or shaft which is secured to the horizontal shaft B before described, so as to extend upwardly from its center, to which it is secured by a set-screw or other convenient device.

D is a nut fitted to travel upon threads of the screw C, and this nut is secured by set-screws E in the hollow tubular shank F. A groove or channel is formed between the shank and head of the nut, and around this groove is loosely fitted a sleeve, H, having lugs I upon opposite sides, and in these lugs the upper ends of the connecting-rods J are hinged. The lower ends of these rods are hinged to the upper outer sides of the buckets A, as shown at K.

Within the hollow shank F may be fixed a long stout pole or handle, which enables the operator to drop the buckets down upon the bed of a river or stream at any suitable depth beneath the surface of the water. By turning the handle around the nut D will be turned and caused to travel up the screw-threads on C, so that the connecting-rods J, traveling with it, will draw the outer edges of the bucket upward and toward each other, thus separating the lower and cutting edges, so that they stand widely apart. In this position the device is lowered upon the bottom which it is desired to explore, and by turning the pole in the opposite direction these buckets are closed and will gather any material upon which they may rest, so that when fully closed they will be filled with the material. The buckets may then be lifted to the surface and the contents deposited, where they may be examined.

This device is especially useful in prospecting the bottoms of rivers or streams, and is especially serviceable where deposits of gold are found in the beds of rivers.

Having thus described my invention, what I claim as new, and desire to secure by Letters Patent, is—

1. The concave buckets A, having their upper inner corners hinged, as shown, in combination with the shank C, extending upward centrally, a nut, D, fitted to travel upon said shank, and connecting-rods J, extending from the loose collar upon the pole or handle to the outer edges of the buckets, so that the buckets are opened and closed by moving the nut up or down upon the shank, substantially as herein described.

2. The buckets A, having their upper inner edges hinged together, their lower opposing edges made scoop-shaped, a centrally-arranged vertical screw passing through a nut which is secured in the rotary tubular shank, in combination with a collar surrounding said shank or nut, which turns loosely within the collar, and connecting-rods having their upper ends hinged in lugs upon the collar and their lower ends in the upper outer ends of the buckets, substantially as herein described.

In witness whereof I have hereunto set my hand.

JOHN HATCH.

Witnesses:
S. H. NOURSE,
H. C. LEE.